US006267478B1

(12) United States Patent
Chen

(10) Patent No.: US 6,267,478 B1
(45) Date of Patent: Jul. 31, 2001

(54) PATTERN-CHANGING STRUCTURE FOR A PROJECTION LIGHT SYSTEM

(76) Inventor: Yu-Shen Chen, PO Box 82-144, Taipei (TW)

( * ) Notice: Subject to any disclaimer, the term of this patent is extended or adjusted under 35 U.S.C. 154(b) by 0 days.

(21) Appl. No.: 09/588,669

(22) Filed: Jun. 6, 2000

(51) Int. Cl.[7] .............................. G03B 21/14; F21M 3/14; F21V 21/28

(52) U.S. Cl. ............................ 353/84; 362/255; 362/279; 362/282

(58) Field of Search ............................... 353/84; 362/255, 362/256, 279, 282, 284, 293

(56) References Cited

U.S. PATENT DOCUMENTS

| | | | | |
|---|---|---|---|---|
| 4,779,176 | * | 10/1988 | Bornhost | 362/223 |
| 5,113,332 | * | 5/1992 | Richardson | 362/282 |
| 5,934,794 | * | 8/1999 | Hutton | 362/283 |

* cited by examiner

*Primary Examiner*—Russell Adams
*Assistant Examiner*—Magda Cruz
(74) *Attorney, Agent, or Firm*—A & J

(57) ABSTRACT

The present invention relates to a pattern-changing structure for a projection light system comprising a base plate, a rotating disc, a motor, and a patterned disc, and the motor is mounted at one lateral side of the base plate, and the shaft center of the cam passes through the center of the base plate and the rotating disc, to form as a unit. A crankshaft having two ends is mounted to the base plate, and one end is mounted with a stopping region and the other end is mounted with a spring hook. The spring hook is connected to a pulling spring and a cavity hole is provided on the base plate for the protrusion of the stopping region. The rotating disc is also provided with a plurality of positioning teeth. When the motor rotates, the cam controls the crankshaft to protrude/extend or to retract, and the positioning teeth is either extended or retracted. Thus, the rotating disc is rotated intermittently and various pattern images are obtained.

6 Claims, 8 Drawing Sheets

PATTERN-CHANGING STRUCTURE FOR A PROJECTION LIGHT SYSTEM

BACKGROUND OF THE INVENTION (a) Technical Field of the Invention

The present invention relates to a pattern-changing structure for a projection light system and in particular, to pattern-changing structure having a rotating disc with various patterns, and by means of intermittent rotating method, the changing of patterns is obtained.

(b) Description of the Prior Art

Referring to FIGS. 8-A, and 8-B, there is shown the structure of pattern rotating disc 60 for a projection light system, comprising a front and back clipping disc 61, and a plurality of light-transmissive holes 62 are formed on the front and back clipping disc 61. A spacer 63 is formed between the front and the back clipping disc 61. Within the spacer 63, a transmission module 64 is provided, wherein the center region of the spacer 63 is mounted with a main transmission disc 65 having a center mounting rod 651. The circumferential edge of the main transmission disc 65 is formed into a teeth portion for the engagement with the teeth portion provided on a plurality of the lateral transmission disc 66. One side of the transmission disc 66 is provided with a positioning ring 67 for mounting with a light-transmissive hole 62, and a patterned disc 68 and a lens positioning seat 69 are mounted on the lateral transmission disc 66. By means of a motor to drive the center mounting rod 651 and the main transmission disc 65, and due to the engagement of the teeth portions of the main transmission disc 65 and the side transmission disc 66, the patterned disc 68 is synchronously rotated. Thus, when the rotating disc 60 rotates, the patterned disc 68 and the lens securing seat 69 revolve. By means of the projection light system, a plurality of patterned light images are obtained.

The conventional rotating disc 60 requires a large amount of parts and therefore, the cost of manufacturing is high, and it is troublesome and laborious to assemble all the parts and this is not economical in production and/or application. The engagement of the teeth portion may cause into the problem of dead engagement. Although the number of patterned discs on the rotating disc 60 are numerous, but each patterned disc 68 is independent and it is troublesome and laborious in installation thereof.

Accordingly, it is an object to provide a pattern-changing structure for a projection light system so as to solve the drawbacks as mentioned.

SUMMARY OF THE INVENTION

Accordingly, it is the main object of the present invention to provide a pattern-changing structures for a projection light, wherein a plurality of different patterned images are obtained, and the images are transmitted intermittently.

Another aspect of the present invention is to provide a pattern-changing structure for a projection light system comprising a base plate, a rotating disc, a motor, a patterned disc, the base plate having a shaft hole at the center thereof, and a light transmissive hole being provided adjacent to the shaft hole and a center hole being provided to the center of the rotating disc, a plurality of circular hole being located at the rotating disc surrounding the center hole, a plurality of screws being provided on the surface of the rotating disc, the motor being mounted at one lateral side of the base plate and the shaft center of the motor being mounted with a cam passed through the base plate, and the center of the rotating disc and an engaging and a disengaging mechanism being combine to form integrally as a unit, characterized in that one lateral side of the base plate is provided with a stopping crankshaft having two ends, one end being mounted with a stopping region and the other end being a spring hook, the spring hook is connected to a pulling-spring, and a cavity hole is provided on the base plate such that the stopping region of the crankshaft is protruded out of the cavity hole, and the circumferential edge of the rotating plate is provided with a plurality of positioning teeth, each teeth being spaced apart at equal distance, thereby, when the motor rotates, the cam controls the extending or retraction of the stopping crankshaft to either release or restrict the positioning teeth so that the rotating disc rotates intermittently and the patterns are changed and various patterned images are obtained.

Other objects and advantages of the present invention will become more apparent from the following description taken in conjunction with the accompanying drawing.

BRIEF DESCRIPTION OF THE DRAWINGS

FIG. 8-B is a perspective view of the conventional rotating disc.

DETAILED DESCRIPTION OF THE PREFERRED EMBODIMENT

Figure 1:
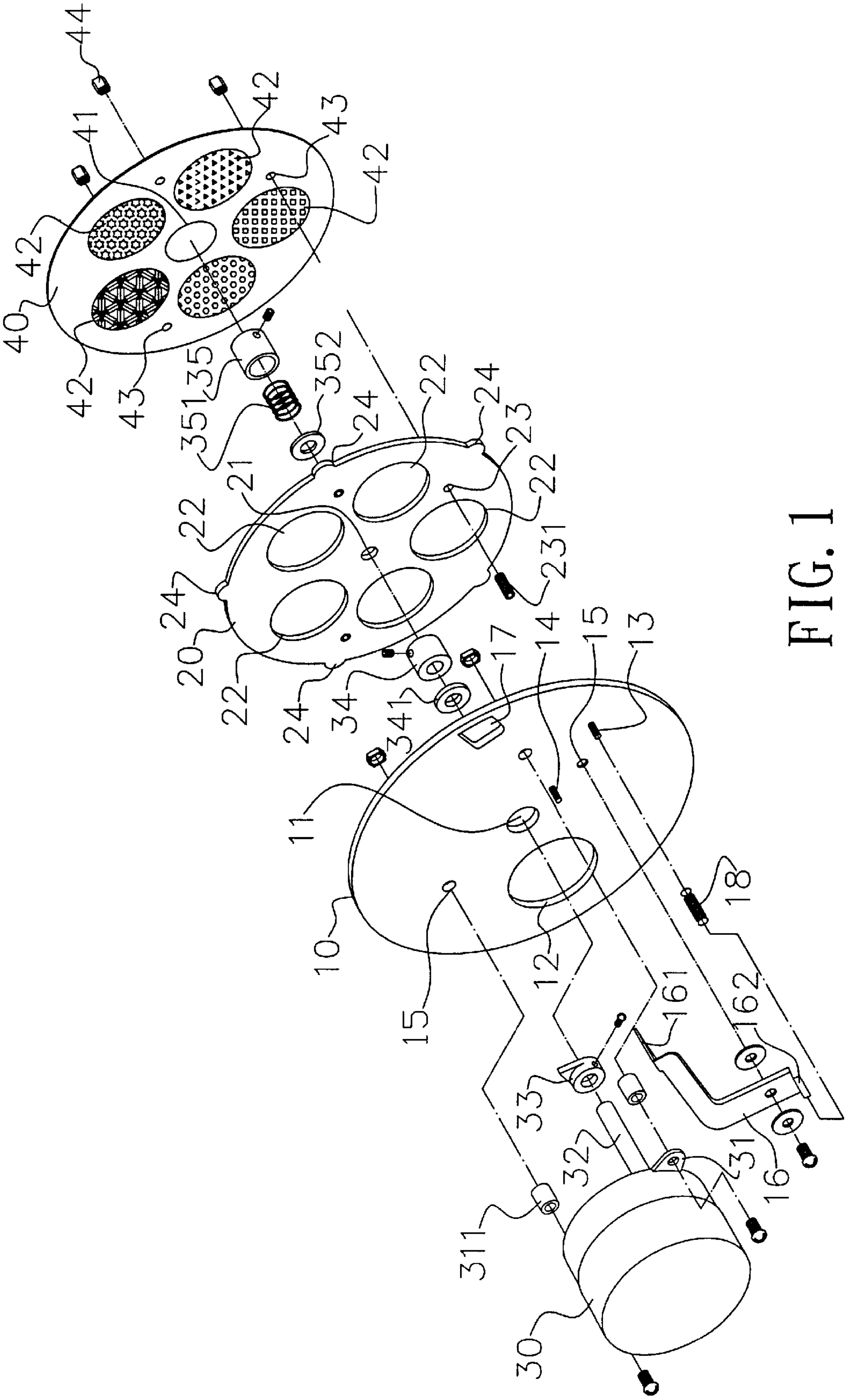
FIG. 1 is a perspective exploded view of the pattern-changing structure of the present invention.

As shown in FIG. 1, there is shown a pattern-changing structure for a projection light system, comprising a base plate 10, a rotating disc 20, a unidirectional motor 30, and a patterned disc 40, wherein the base plate 10 is a circular disc shape having a center shaft hole 11 and a light-transmissive hole 12 adjacent to the shaft hole 11, a securing peg 13, a lower positioning peg 14, and a plurality of positioning holes 15 are formed on the lateral side of the base plate 10. A stopping crankshaft 16 having two ends respectively provided with a spring hook 162 and a stopping region 161 is provided at one side of the base plate 10, and at the circumferential edge of the base plate 10, a cavity hole 17 is provided, and a pulling spring 18 is pivotally mounted to the spring hook 162 at one end, and the other end of the pulling spring 18 is mounted to the securing peg 13, and the stopping crankshaft 16 urges the lower positioning peg 14, and the stopping region 161 passes through the cavity hole 17 and protrudes out at the ether lateral side of the base plate 10.

The rotating disc 20 is circular but with diameter slightly smaller than that of the base plate 10, and is located at one lateral side of the base plate 10. The center of the rotating disc 20 is provided with a center hole 21, and a plurality of circular holes 22 are formed around the center hole 21, and a plurality of screw holes 23 with securing screws 231 are provided, and a plurality of protruded positioning teeth 24 are provided at the circumferential edge of the rotating disc 20 and are equally distributed along the circumference of the rotating disc. The number of protruded positioning teeth 24 is the same as that of the circular holes 23.

The motor 30 is the power source for the rotation of the rotating disc 20, and the circumferential edge of the motor housing is mounted with a corresponding mounting flap 31, together with a hollow tube 311 and a screw, the motor 30 mounted at the positioning hole 15 on the base plate 10 and is then secured with screw nuts. The motor 30 has a shaft center 32, which is mounted with a cam 33 such that is moves synchronously with the shaft center 32.

The shaft center 32 is mounted with the base plate 10 and the rotating disc 20 in sequence, and a shaft center sleeve 34 and a pad 341 are provided in between the base plate 10 and the rotating disc 20. The end of the shaft center 32 is mounted with a pressure spring box 35 which is mounted by screw. The pressure spring box 35 contains a pressure spring 351 together with a pad 352 which is urged tightly by the pressure spring 35 such that the rotating disc 20, under no stopping mechanism, rotates synchronously with the shaft center 32 of the motor 30 and forms into an engaging and disengaging mechanism. The pad 352 is used to prevent frictional force when the shaft center 32 rotates while the rotating disc 20 is intermittently stopped.

The patterned disc 40 has a center mounting hole 41 surrounded by a plurality of circular patterns 42 which correspond to the circular hole 22 of the rotating disc 20. On the patterned disc 40, a plurality of positioning holes 43 are provided for the mounting of screw 231 on the rotating disc 20 and then is fastened by the screw nut 44 such that the patterned disc 40 is fastened.

Figure 2:
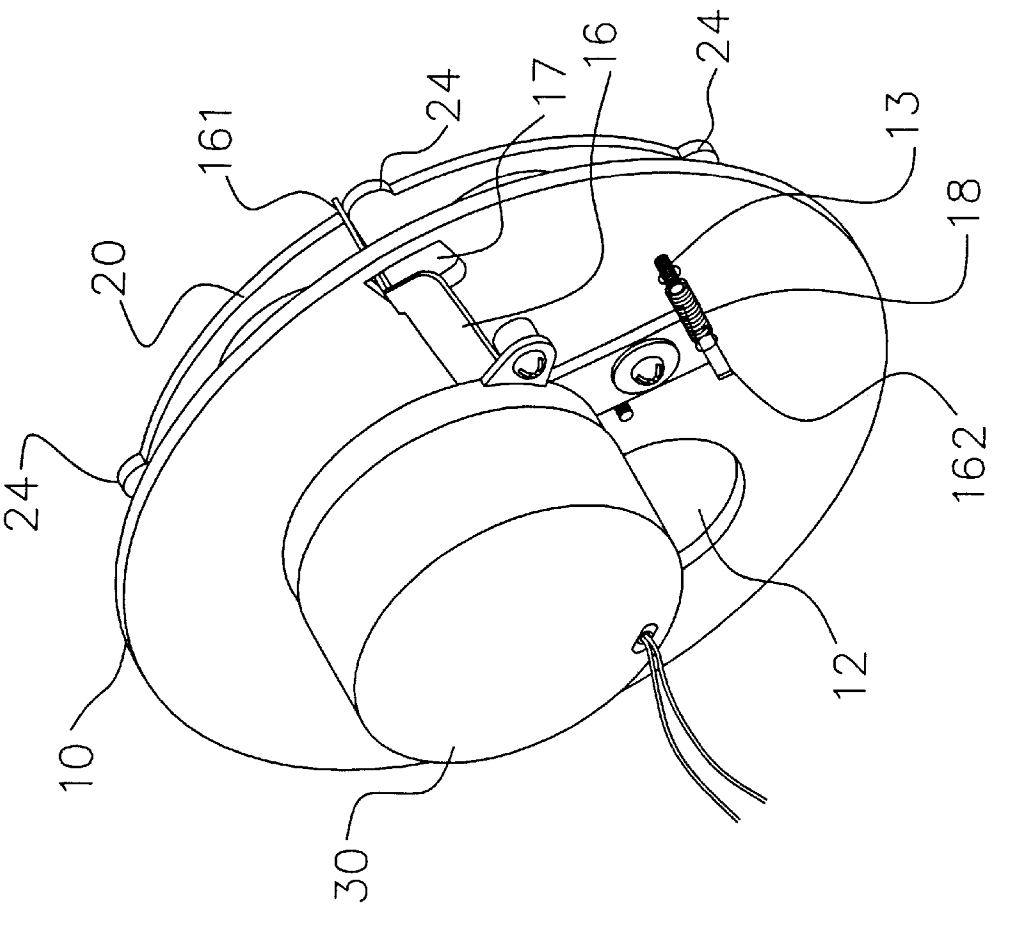
FIG. 2 is a perspective view of the pattern-changing structure of the present invention.
Figure 3B:
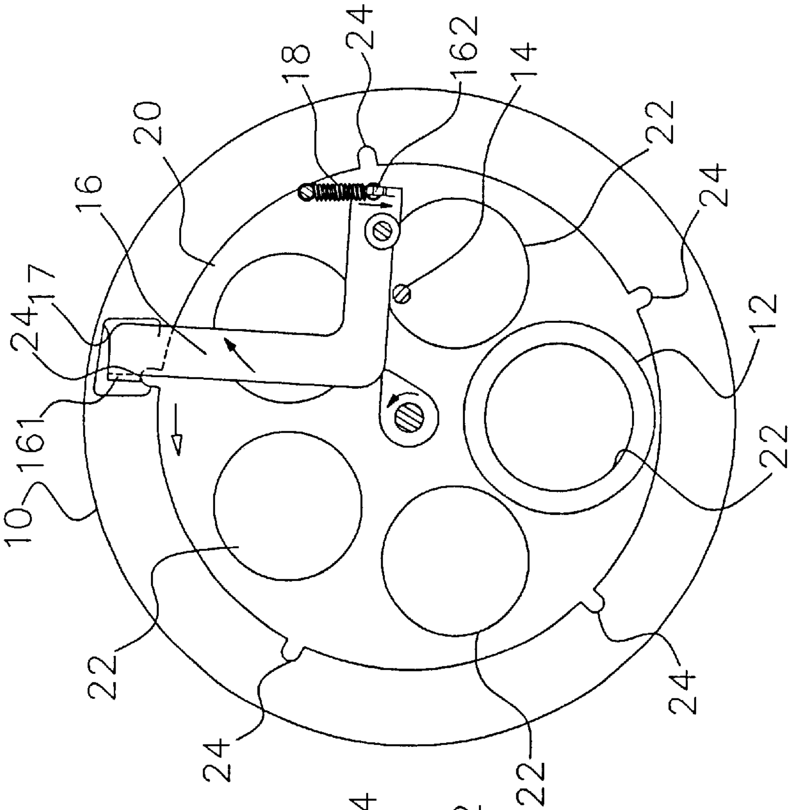
FIGS. 3-A, 3-B, 4-A, 4-B, schematically show the action of the pattern-changing structure in accordance with the present invention.
Figure 3A:
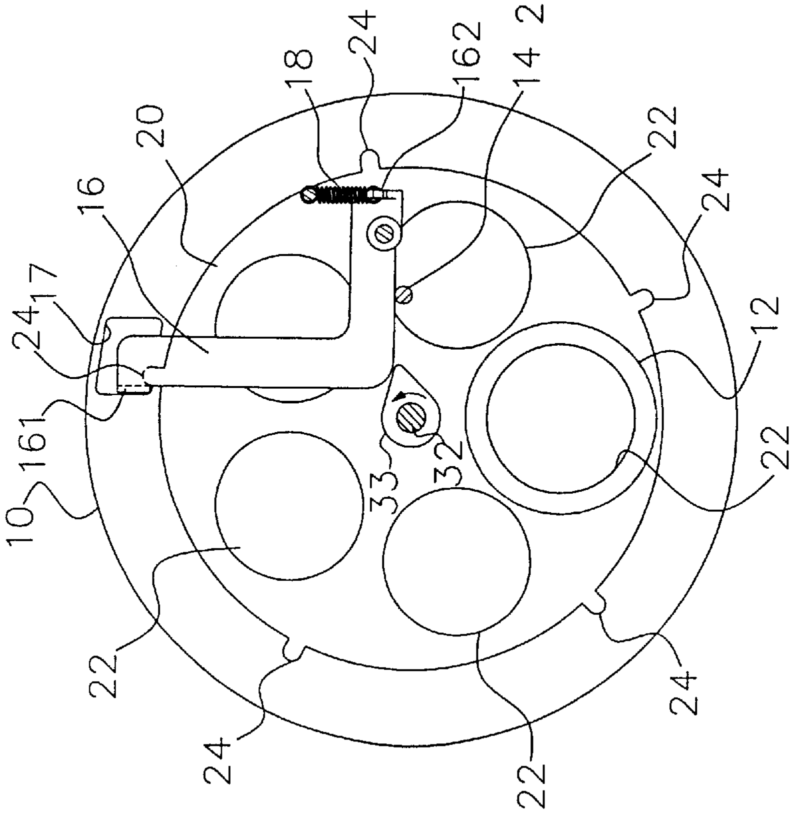
Figure 4B:
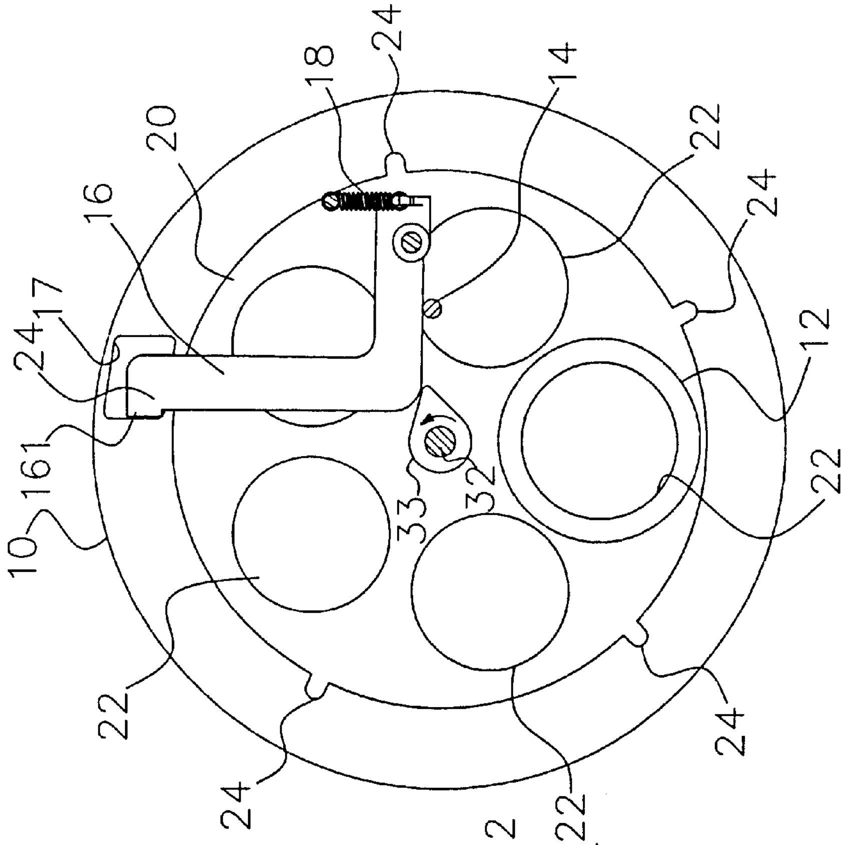
Figure 4A:
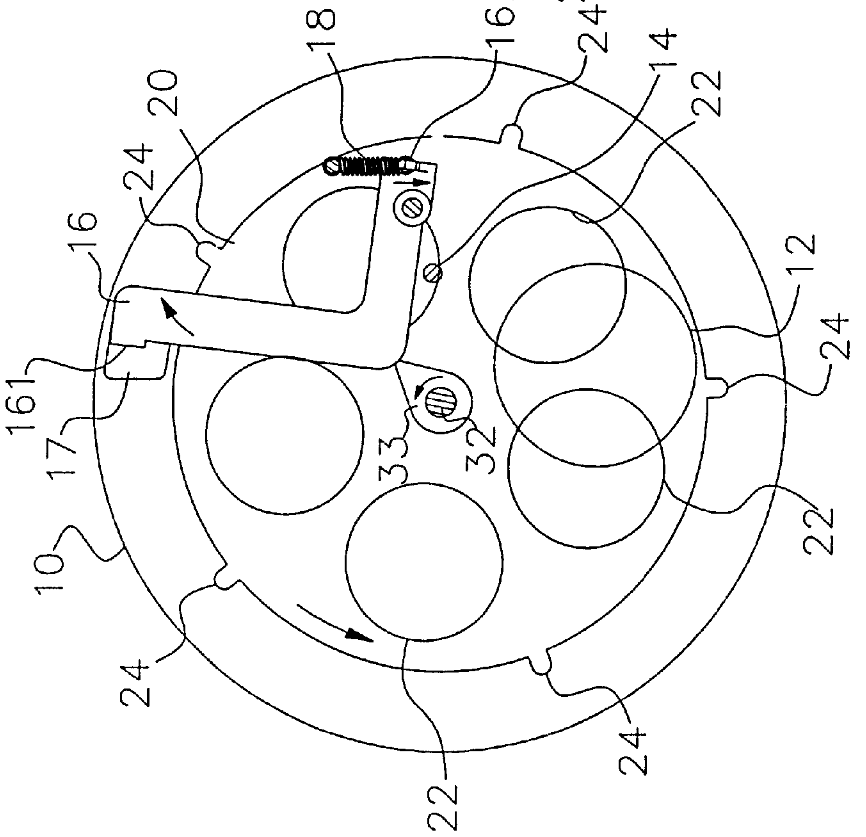
Figure 7:
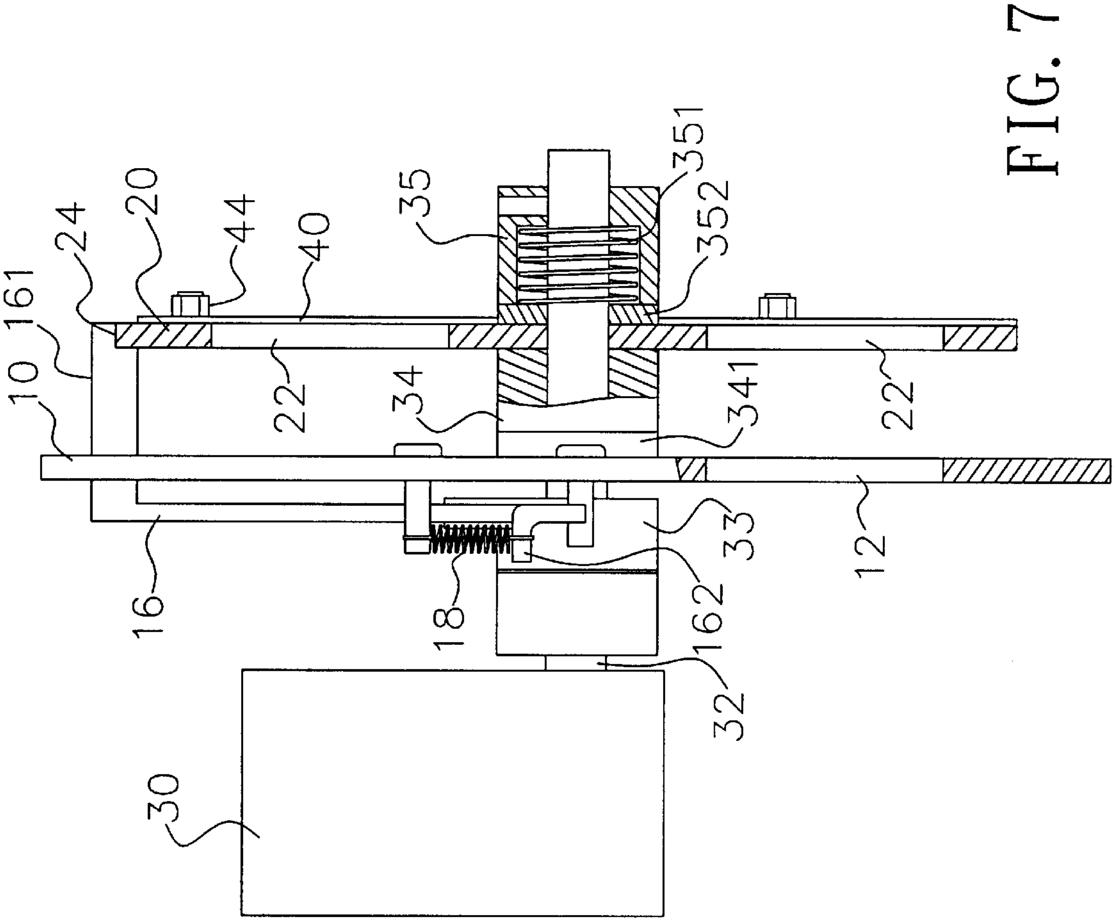
FIG. 7 is a sectional view of the pattern-changing structure of the present invention.
Figure 8A:
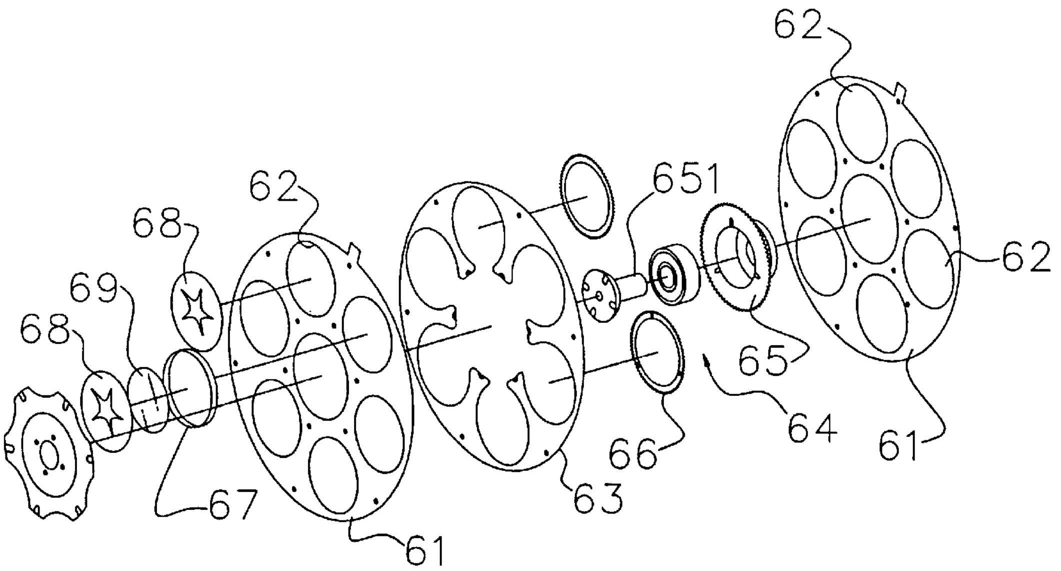
PRIOR ART FIG. 8A
FIG. 8-A is a perspective exploded view of the conventional rotating disc.
Figure 8B:
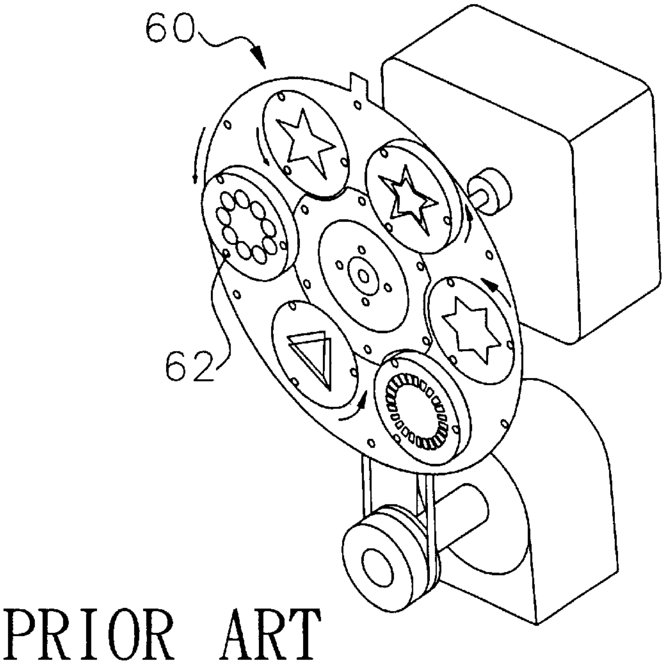
PRIOR ART FIG. 8B

A completed structure of a pattern-changing structure of a projection light system in accordance with the present invention is shown in FIGS. 2 and 7.

Referring to FIGS. 2, 3A, 3B, 4A and 4B, when the motor 30 is activated, the shaft center 32 of the motor 30 rotates. The cam 33 and the shaft center 32 are combined integrally into a unit and rotate synchronously. As the cam 33 has not touched the stopping crankshaft 16, the positioning teeth 24 at the circumferential edge of the rotating disc 20 is restricted by the stopping region 161 and becomes stationery, which is shown in FIG. 3-A.

When the cam 33 continues to rotate, its end touches the stopping crankshaft 16, the crankshaft 16 will be pushed outward such that the stopping region 161 will dislocate from the positioning teeth 24, and the pulling spring 18 is stretched. At this moment, the rotating disc 20 is not restricted but rotates smoothly, which is shown in FIGS. 3-B and 4-A. When the cam 33 continues to rotate, its end is disengaged from touching the stopping crankshaft 16, and as a result of the restoration force of the pulling spring 18, the stopping crankshaft 16 is retracted. At this moment, the next positioning teeth 24 at the circumferential edge of the rotating disc 20 is again restricted by the stopping region 161 such that the rotating disc 20 will not rotate synchronously with the shaft center 32, and a temporary stop is formed, as shown in FIG. 4-B. Following this pattern of action, the rotating disc 20 provides a series of intermittent effect.

Figure 5:
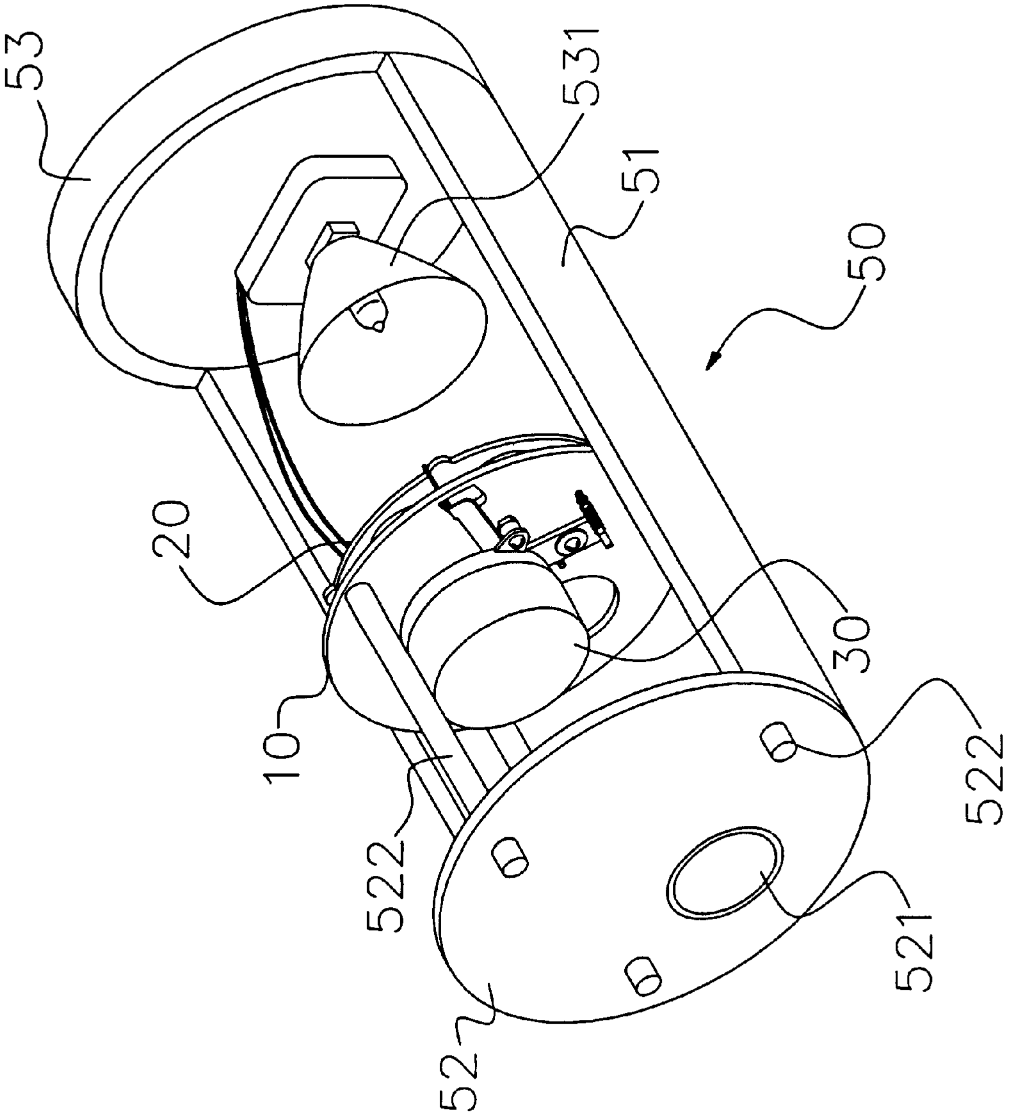
FIG. 5 is a perspective view of the pattern-changing structure within a projection light system in accordance with the present invention.
Figure 6:
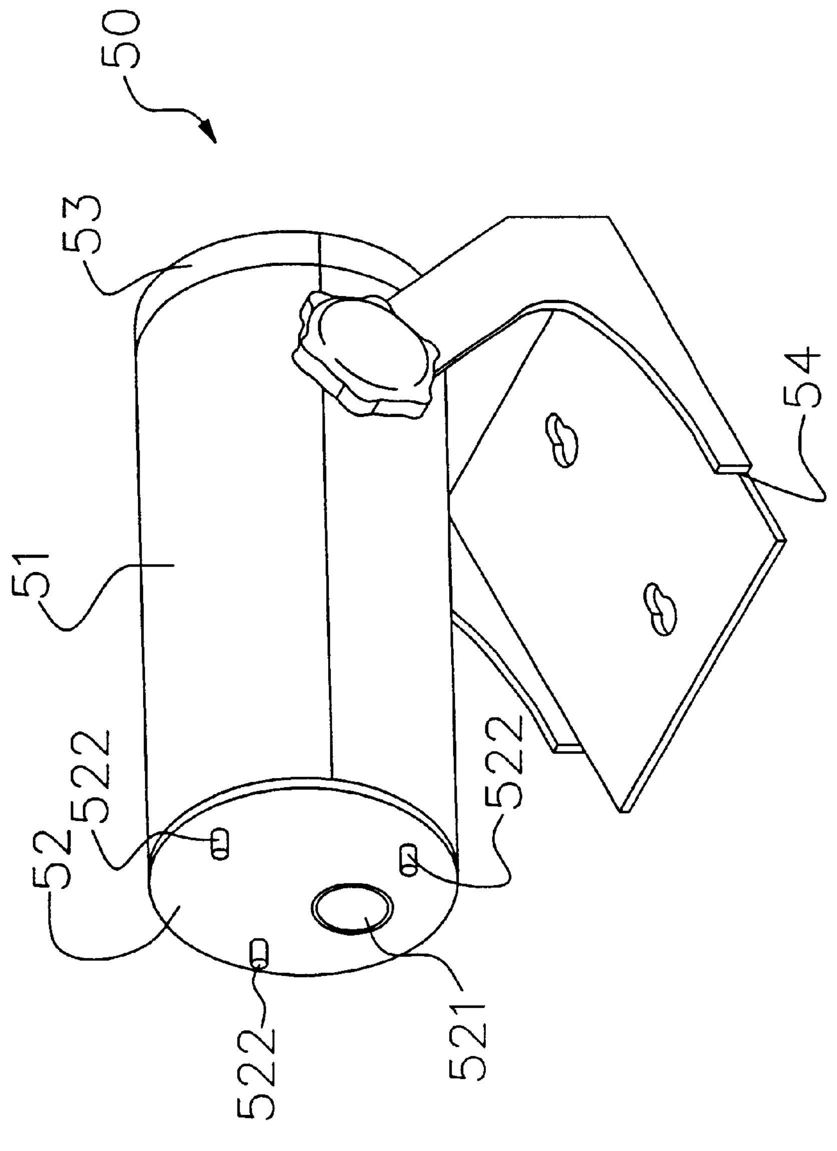
FIG. 6 is a perspective view of the projection light system in accordance with the present invention.

Referring to FIGS. 5 and 6, the pattern-changing structure combined with a projection light system is shown. The projection light 50 is provided with a housing 51, enclosed by a front, back cap 52, 53, and is a cylindrical structure having a base seat 54. The front cap 52 is provided with a light-transmissive lens 521 located away from the center axis of the front cap 52. A plurality of screw rods 522 are used to combine the front and back cap 52, 53 with the base plate 10 such that the position of the lens 521 corresponds with the light transmissive hole 12 of the base plate 10, and the screw rods 522 are protruded out of the surface of the front cap 52 to facilitate taking out the base plate 10, and the smooth changing of the patterned disc 40. The back cap 53 is similarly mounted with a light bulb seat 531 having a light bulb. Thus, after all the parts are assembled, the light bulb seat 531, the circular patterns 42, the circular hole 22, the light-transmissive hole 12 and the light transmissive lens 521 are in alignment and the light from the light bulb, via the lens 521, causes the formation of projected, patterned light images, and in combination with the rotating disc 20 which rotates intermittently, various patterns 42 located at the patterned disc 40 are formed and stationed for a moment before another patterned image is formed.

The advantages obtained from the present invention are as follows:

1. The required pattern is obtained and positioned more precisely by means of simple mechanical structure.
2. As the parts forming the structure are comparatively fewer, mechanical faults are not normally occurred.
3. No expensive servomotor or electronic PC parts are required, and therefore, the cost of manufacturing is greatly reduced.
4. The patterned disc can be easily changed based on personal requirement.

While the invention has been described with respect to preferred embodiments, it will be clear to those skilled in the art that modifications and improvements may be made to the invention without departing from the spirit and scope of the invention. Therefore, the invention is not to be limited by the specific illustrative embodiment, but only by the scope of the appended claims.

I claim:

1. A pattern-changing structure for a projection light system comprising a base plate, a rotating disc, a motor, a patterned disc, the base plate having a shaft hole at the center thereof, and a light transmissive hole being provided adjacent to the shaft hole and a center hole being provided to the center of the rotating disc, a plurality of circular hole being located at the rotating disc surrounding the center hole, a plurality of screws being provided on the surface of the rotating disc, the motor being mounted at one lateral side of the base plate and the shaft center of the motor being mounted with a cam passed through the base plate, and the center of the rotating disc and an engaging and a disengaging mechanism being combine to form integrally as a unit, characterized in that one lateral side of the base plate is provided with a stopping crankshaft having two ends, one end being mounted with a stopping region and the other end being a spring hook, the spring hook is connected to a pulling-spring, and a cavity hole is provided on the base plate such that the stopping region of the crankshaft is protruded out of the cavity hole, and the circumferential edge of the rotating disc is provided with a plurality of positioning teeth, each teeth being spaced apart at equal distance, thereby, when the motor rotates, the cam controls the extending or retraction of the stopping crankshaft to either release or restrict the positioning teeth so that the rotating disc rotates intermittently and the patterns are changed and various patterned images are obtained.

2. A pattern-changing structure as set forth in claim 1, wherein the cam is mounted to the shaft center of the motor by means of a screw so as to firmly secure the motor.

3. A pattern-changing structure as set forth in claim 1, wherein the inner side of the stopping crankshaft is provided with a lower positioning peg to prevent the dislocation of the stopping crankshaft.

4. A pattern-changing structure as set forth in claim 1, wherein the end terminal of the shaft center of the motor is mounted with a pressure spring box containing a pressure spring, and a pad is provided.

5. A pattern-changing structure as set forth in claim 1, wherein a plurality of securing screws are provided on the rotating disc for the mounting of the patterned disc.

6. A pattern-changing structure as set forth in claim 1, wherein a plurality of positioning teeth are provided on the rotating disc for interaction with the stopping crankshaft.

* * * * *